United States Patent
Kim et al.

(10) Patent No.: US 7,907,567 B2
(45) Date of Patent: Mar. 15, 2011

(54) METHOD FOR ALLOCATING RESOURCES TO UPLINK CONTROL CHANNEL

(75) Inventors: Hak Seong Kim, Seoul (KR); Bong Hoe Kim, Gyeongggi-do (KR); Ki Jun Kim, Seoul (KR); Suk Hyon Yoon, Seoul (KR); In Jae Jung, Seoul (KR); Dae Won Lee, Gyeonggi-do (KR); Joon Kui Ahn, Seoul (KR); Dong Youn Seo, Seoul (KR)

(73) Assignee: LG Electronics, Inc., Seoul (KR)

( * ) Notice: Subject to any disclaimer, the term of this patent is extended or adjusted under 35 U.S.C. 154(b) by 685 days.

(21) Appl. No.: 11/865,639

(22) Filed: Oct. 1, 2007

(65) Prior Publication Data

US 2008/0102846 A1 May 1, 2008

Related U.S. Application Data

(60) Provisional application No. 60/827,640, filed on Sep. 29, 2006.

(30) Foreign Application Priority Data

Apr. 4, 2007 (KR) .................. 10-2007-0033297

(51) Int. Cl.
  *H04W 4/00* (2009.01)
  *H04W 72/00* (2009.01)
  *H04L 12/28* (2006.01)

(52) U.S. Cl. ......... 370/329; 370/341; 370/431; 455/450

(58) Field of Classification Search .......... 370/328–329, 370/341, 431, 437; 455/151.1, 154.1, 166.2, 455/179.1, 450–453, 464, 509
See application file for complete search history.

(56) References Cited

U.S. PATENT DOCUMENTS

| | | | |
|---|---|---|---|
| 7,738,418 B2* | 6/2010 | Kwon et al. | 370/328 |
| 2007/0171809 A1* | 7/2007 | Pajukoski et al. | 370/208 |
| 2007/0183384 A1* | 8/2007 | Kwak et al. | 370/338 |
| 2007/0293233 A1* | 12/2007 | Inoue et al. | 455/450 |
| 2008/0039098 A1* | 2/2008 | Papasakellariou et al. | 455/442 |
| 2008/0049690 A1* | 2/2008 | Kuchibhotla et al. | 370/338 |
| 2008/0095106 A1* | 4/2008 | Malladi et al. | 370/329 |
| 2008/0212532 A1* | 9/2008 | Heo et al. | 370/330 |
| 2008/0212556 A1* | 9/2008 | Heo et al. | 370/344 |
| 2008/0233966 A1* | 9/2008 | Scheim et al. | 455/452.1 |
| 2009/0213802 A1* | 8/2009 | Miki et al. | 370/329 |
| 2010/0103901 A1* | 4/2010 | Miki et al. | 370/330 |
| 2010/0118825 A1* | 5/2010 | Kawamura et al. | 370/330 |

FOREIGN PATENT DOCUMENTS

| | | |
|---|---|---|
| EP | 0841763 | 5/1998 |
| WO | 9837706 | 8/1998 |
| WO | 9941918 | 8/1999 |
| WO | 0186992 | 11/2001 |
| WO | 2004068886 | 8/2004 |

* cited by examiner

*Primary Examiner* — Tri H Phan
(74) *Attorney, Agent, or Firm* — Lee, Hong, Degerman, Kang & Waimey

(57) ABSTRACT

A method for adaptively allocating resources of an uplink control channel according to a system situation is disclosed. If a base station (BS) recognizes the system situation, establishes control information for resource allocation, and transmits the control information to a mobile station (MS), the mobile station (MS) allocates resources for transmitting uplink control information using a specific block or a specific resource distribution method according to the corresponding control information. The system situation may be changed according to the number of users contained in the BS's coverage or the usage of a multi-antenna. The variation of the system situation is actively reflected so that the uplink channel resources can be effectively used.

12 Claims, 4 Drawing Sheets

METHOD FOR ALLOCATING RESOURCES TO UPLINK CONTROL CHANNEL

CROSS-REFERENCE TO RELATED APPLICATIONS

This application claims the benefit of Korean Patent Application No. 10-2007-0033297, filed on Apr. 4, 2007, which is hereby incorporated by reference as if fully set forth herein.

This application also claims the benefit of U.S. Provisional Application Ser. Nos. 60/827,640, filed on Sep. 29, 2006, the contents of which are hereby incorporated by reference herein in their entirety.

BACKGROUND OF THE INVENTION

1. Field of the Invention

The present invention relates to a method for adaptively allocating resources of an uplink control channel according to the situation of a system.

2. Discussion of the Related Art

The 3rd Generation Partnership Project (3GPP) Long Term Evolution (LTE) system includes one or more physical channels and a logical channel mapped to the one or more physical channels. The logical channels are classified into a control channel, a common channel, a dedicated control channel, and a traffic channel, etc. Specifically, an example of the uplink control channel may be a Channel Quality Information CHannel (CQICH).

A conventional method for allocating resources to the uplink control channel is a pre-reserved method. The pre-reserved method estimates the amount of control information to be transmitted to an uplink, pre-reserves the proper amount of uplink resources, and allows a plurality of users to share the corresponding resources.

The pre-reserved method has an advantage in that there is no need to transmit downlink control information capable of transmitting a command associated with a resource allocation method to a mobile station (MS). However, it has difficulty in properly coping with some troublesome situations caused by the insufficient or excessive amount of pre-reserved resources.

In other words, the number of users contained in a coverage of a base station (or Node-B) or the amount of various control information fed back to the uplink may be changed to others according to the situation of a system. The above-mentioned system situation may indicate the number of users of an uplink channel, specific information indicating whether the uplink control channel is used or not, the amount of data or control information transferred via the uplink control channel, the degree of interference, specific information indicating whether a multi-antenna is used, a channel quality information transmission scheme, and a channel situation, etc.

In this case, if the number of users of the uplink channel increases, or the amount of uplink-channel control information increased by the mobile station (MS) based on a multi-antenna scheme is greater than the amount of pre-reserved resources, the pre-reserved method must transmit the uplink-channel control information several times, so that it is unable to implement smooth communication between a transmission end and a reception end. Otherwise, if the small number of users is located in the base station's coverage and the amount of control information to be transferred to the uplink is low, the pre-reserved method has a disadvantage in that it unconditionally allocates all of pre-reserved resources including unnecessary resources not to be used to the users, resulting in the occurrence of wasted resources.

SUMMARY OF THE INVENTION

Accordingly, the present invention is directed to a method for allocating resources to an uplink control channel that substantially obviates one or more problems due to limitations and disadvantages of the related art.

An object of the present invention is to provide a method for adaptively allocating resources to an uplink control channel according to the number of users contained in the base station's coverage and the variation of an amount of feedback information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a resource allocation method for transmitting uplink control information in a mobile communication system comprising: receiving, by a mobile station (MS), control information established by a base station (BS) in consideration of a system situation; and allocating resources of an uplink control channel according to the received control information.

In another aspect of the present invention, there is provided a method for transmitting downlink control information to allocate resources of an uplink channel in a mobile communication system comprising: generating, by a base station (BS), control information for allocating resources of an uplink control channel in consideration of a system situation; transmitting the control information to a mobile station (MS); and allocating resources of the uplink control channel according to the control information.

Preferably, the system situation includes at least one of the number of uplink/downlink users, an amount of transmission data, an amount of control information, a channel situation, a channel quality information transmission scheme, an amount of allocation resources, an amount of available resources, an interference degree, and an allocation location of a control channel.

Preferably, the control information for allocating resources of the uplink control channel includes at least one of an amount of allocation resources required for smoothly transmitting the uplink control information and the appropriate resource allocation location.

Preferably, the resource allocation location includes at least one of information indicating a resource area where the uplink control information is to be transmitted, and information indicating a resource distribution scheme.

In this case, the resource distribution scheme can be classified into a partial transmission method and a repetitive transmission method. If an area for transmitting the control information is larger than a maximum area/capacity capable of being allocated to a single symbol or a single sub-frame, the partial transmission method divisionally transmits the corresponding control information over several symbols or sub-frames. The repetitive transmission method may be used along with the partial transmission method or may be used separately from the partial transmission method, so that it controls the uplink control information to be repeatedly transmitted over several sub-frames.

The extended block of the partial transmission method may belong to a symbol to which the basic block belongs, a symbol equal to a sub-frame, or a sub-frame. And, the extended block may belong to a symbol to which the basic symbol belongs, a symbol different from a sub-frame, or a sub-frame.

The resource allocation for the extension or repetition of the partial or repetitive transmission method is implemented by a frequency-hopping action for each sub-frame.

Preferably, the resources may be allocated to maintain a single-carrier characteristic between constituent information units of the uplink control information.

Preferably, the resources may be allocated to maintain a single-carrier characteristic between the uplink control information and the uplink data.

The uplink control information may be CDM- or TDM-multiplexed along with the uplink user data, so that the multiplexed uplink control information may be transmitted to a destination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The following techniques to be disclosed will be used for a variety of communication systems. The communication systems are deployed to a wide range of areas to provide users with a variety of communication services (e.g., voice or packet data). The above-mentioned techniques may be applied to a downlink or uplink. In this case, the downlink indicates data communication from a base station (BS) to a mobile station (MS), and the uplink indicates data communication from the mobile station (MS) to the base station (BS).

Generally, the base station (BS) indicates a fixed station communicating with the mobile station (MS), and may also be called a Node-B, a BTS (Base Transceiver System), or an Access Point (AP), etc. The mobile station (MS) may be fixed at a specific location or may have the mobility, so that it may also be called a user equipment (UE), a user terminal (UT), a subscriber station (SS), or a wireless device, etc.

Figure 1:
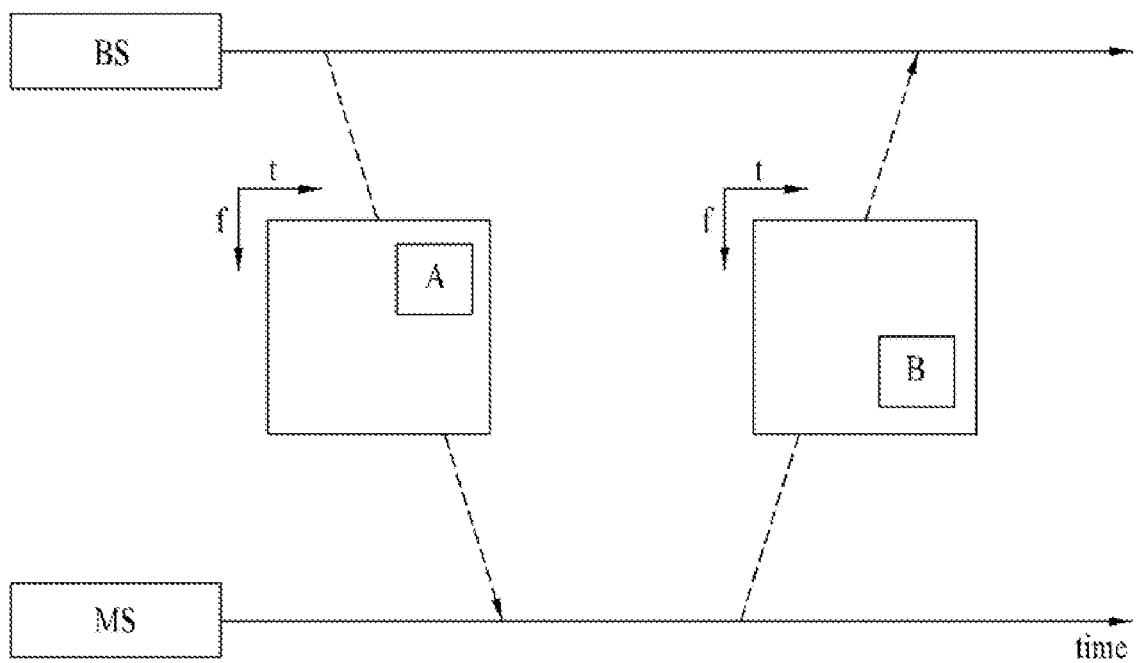
FIG. 1 is a conceptual diagram illustrating a method for allocating resources to an uplink control channel according to the present invention.

FIG. 1 is a conceptual diagram illustrating a method for allocating resources to an uplink control channel according to the present invention.

<Operations of Base Station (BS)>

The base station (BS) establishes control information required for allocating resources to an uplink control channel in consideration of a system situation, and transmits the established control information to the mobile station (MS).

In FIG. 1, the A area indicates a resource allocation area of a downlink capable of transmitting the above-mentioned control information to the mobile station (MS).

The system situation which must be recognized by the base station (BS) includes at least one of a variety of information, for example, the number of uplink/downlink users, the amount of downlink transmission data, an amount of uplink control information, a channel situation, a method for transmitting the channel quality information, an amount of currently-allocated resources, an amount of current available resources, the degree of interference between users, and an allocation location of a control channel.

The control information transmitted to the downlink by the base station (BS) to implement the scheduling includes at least one of an amount of allocation resources required for smoothly transmitting uplink control information and an allocation location.

In this case, the allocation location contained in the above-mentioned control information includes at least one of a block (LB or SB) capable of transmitting the control information and a resource-localized method (also called a resource-distributed method). The block LB or SB to be transmitted and the resource-localized method will hereinafter be described in detail.

<Operations of Mobile Station (MS)>

The mobile station (MS) refers to not only the amount of uplink control information contained in the above-mentioned control information but also the resource allocation location contained in the same, and transmits resources of the uplink control channel.

In FIG. 1, the B area indicates a resource allocation area of a downlink capable of transmitting the above-mentioned control information to the mobile station (MS). In other words, the B area is indicative of a specific area scheduled by control information received from the base station (BS). The B area is variable with the amount of control information, and the location and size of the B area is dynamically or semi-statically established.

<Uplink Control Information>

The uplink control information is classified into first control information, second control information, and third control information.

The first control information is directly related with transmission of uplink data, and a representative example is a TFCI. The second control information is not directly related with the transmission of uplink data, and a representative example is a CQI or ACK/NACK. The third control information allows the base station (BS) to measure a channel of data transmitted to the uplink, and a representative example is a CQ pilot.

The present invention can be equally applied to not only the first to third control information but also a variety of control information transferred to the uplink.

Figure 2:
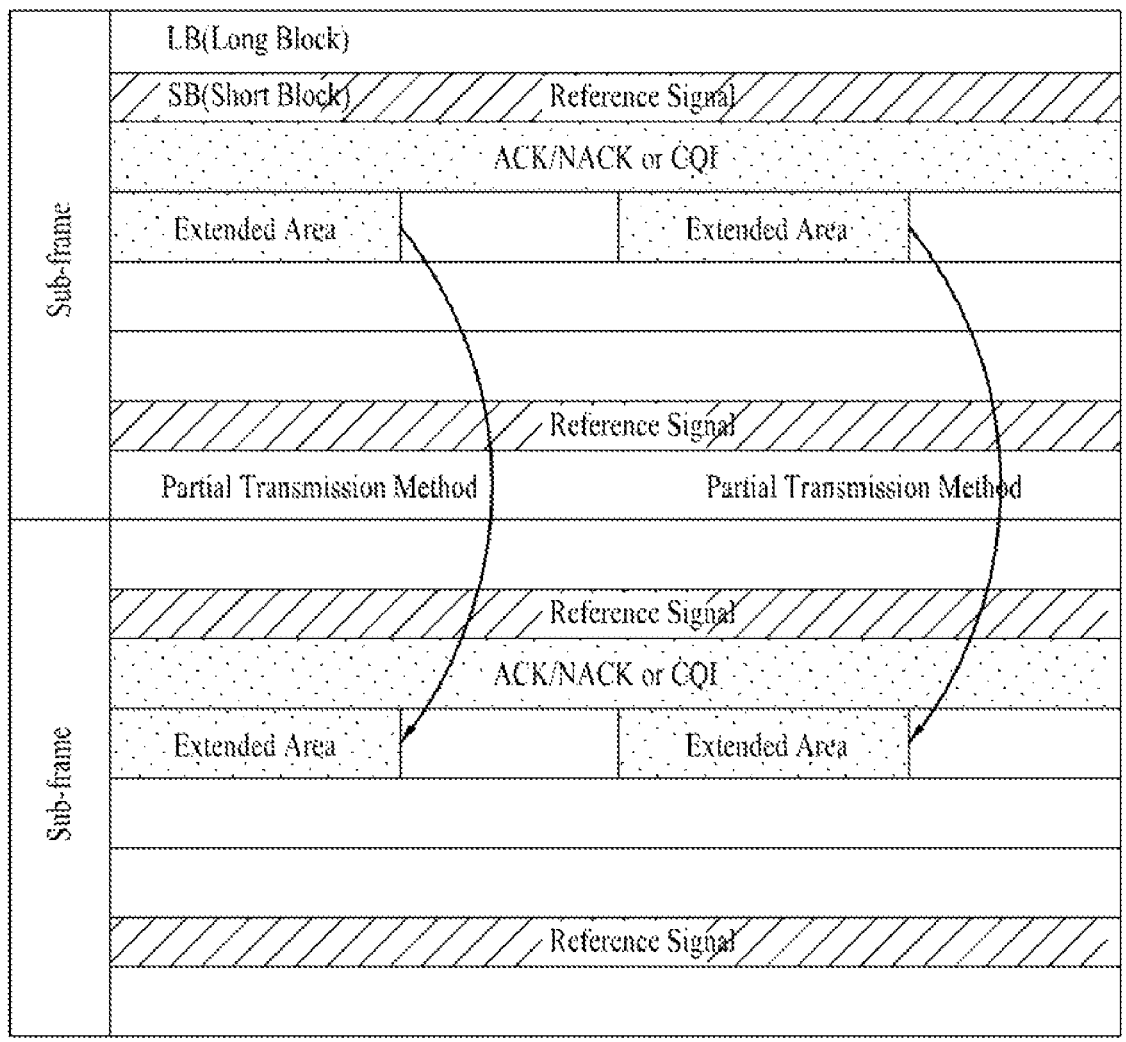
FIG. 2 is a conceptual diagram illustrating an example of a resource distribution method from among the inventive resource allocation methods according to the present invention.

FIG. 2 is a conceptual diagram illustrating an example of a resource distribution method from among the inventive resource allocation methods according to the present invention.

The downlink control information for scheduling uplink resources may include information associated with the method for allocating the uplink resources. Specifically, if control information is variable, the downlink control information may also include information indicating a resource transmission method capable of accommodating the variable control information.

<Block Desired to Transmit Uplink Control Information>

According to the LTE assumption, a single sub-frame of the uplink includes 6 long blocks (LBs) and 2 short blocks (SBs). The number of LBs or SBs may be changed to another at a later time, so that it is assumed that a symbol used for transmitting the uplink control information is basically denoted by "LB", however, the symbol may also be denoted by "SB" as necessary.

Generally, the SB is established on the assumption that a reference signal is transmitted, so that it is difficult for high-capacity control information (e.g., CQI) to be added to the SB. In other words, the SB is not enough to additionally involve the high-capacity control information.

Therefore, the uplink control information according to the present invention is basically transferred via the LB, however, it should be noted that low-capacity uplink control information (e.g., ACK/NACK) can be transferred to via not only the LB but also the SB.

<Resource Distribution Method>

The resource distribution method can be classified into a partial transmission method and a repetitive transmission method.

If an amount of uplink control information is larger than a predetermined level, the partial transmission method divides the uplink control information into several information units, and transmits the divided information units, so that overall uplink control information is divisionally transmitted to a destination.

The repetitive transmission method transmits control information N times over several symbols or several sub-frames, so that it increases a reception reliability of the control information. For example, if the value of N is 2, the repetitive transmission method may transmit the control information twice.

The partial transmission method is adapted to transmit uplink control information (e.g., CQI) of a relatively high capacity.

The repetitive transmission method is used for a specific case in which the same control information (e.g., ACK/NACK) must be repeatedly transmitted according to the system situation.

However, the same resource distribution method is applied to the partial transmission method and the repetitive transmission method, so that the following detailed description of the partial transmission method will substitute for that of the repetitive transmission method.

<Partial Transmission Method>

The relatively high-capacity uplink control information such as CQI may not be simultaneously transmitted to a single resource area unit. In this case, the mobile station (MS) transmits the corresponding uplink control information over a plurality of resource areas.

In this case, if the control information is variable so that it is larger than a basic unit for transmitting the control information, the partial transmission method can transmit the control information over several symbols or several sub-frames.

In this case, it is basically assumed that the control information between users is multiplexed according to a CDM (Code Division Multiplexing) or TDM (Time Division Multiplexing) scheme so that the multiplexed control information is transmitted to the users.

Specifically, the partial transmission method may extend the part exceeding the single basic transmission unit to the next basic transmission unit, and may also extend the above-mentioned part to resource areas spaced apart from each other. In this case, the resource area indicates an area composed of a frequency area and a time area, and the basic size of the resource area may be established in different ways according to the system situation.

The amount of uplink control information to be fed back to the base station (BS) may increase or decrease due to the variation of the system situation. A representative exemplary case in which the uplink control information increases may be a specific case in which a current single-antenna system is changed to a multi-antenna system such as a MIMO system.

For example, in the case of comparing a first case employing the MIMO system with a second case unemploying the MIMO system, the amount of feedback control information of the first case may be much larger than that of the second case. In more detail, the first case employing the MIMO system requires B resource-units whereas the second case unemploying the MIMO system requires A resource-units (where, $A \leqq B$). In this case, the area for transmitting the control information is extended so that the control information may be transmitted over several symbols or several sub-frames.

For example, provided that the control information transferred to the uplink is the CQI, the system uses a DCT (Discrete Cosine Transform)-based CQI transmission scheme, and the CQI to be transmitted exceeds a single resource area, the CQI is distributed to several resource areas (i.e., several symbols or several sub-frames) and is then transmitted over the several symbols or sub-frames.

For example, if the CQI is multiplexed according to the TDM scheme and the magnitude of the DCT-processed CQI is M, M/2 is assigned to a first sub-frame, and the other M/2 is assigned to a second sub-frame. Preferably, if the CQI accuracy is more important than the system complexity, the CQI may be newly DCT-processed for each sub-frame, and some parts of the DCT-processed CQI may be transmitted to a desired destination.

If the CQI is multiplexed according to the TDM scheme while the Best-M CQI transmission method is used, M/2 information from among the M information is assigned to a first sub-frame and the other M/2 information is assigned to a second sub-frame, so that the CQI is divisionally transmitted. If the partial transmission method and the repetitive transmission method are simultaneously used, each information is repeated so that the repeated information is transmitted over four sub-frames. If the CDM scheme is used, the CQI may be multiplexed simultaneously while maintaining orthogonality over allocated resource areas, or be CDM-processed for each basic transmission unit, so that the resultant CQI is transmitted to a desired destination.

In the meantime, although the same MIMO modes are provided, the amount of CQI to be fed back may be changed to another amount according to categories of a codeword to be transmitted. In this case, the method for transmitting control information over the extended resource areas may also be applied to the above-mentioned case in which the amount of feedback CQI is changed to another amount according to the codeword categories.

For example, if data is TDM-multiplexed by a system equipped with a TTI composed of two sub-frames, the system transmits the CQI using only the first sub-frame during the non-MIMO mode. Thereafter, if the non-MIMO mode is changed to the MIMO mode, the system distributes the CQI to two sub-frames so that it transmits the CQI over the two sub-frames. Needless to say, if the CQI includes four streams, two streams may be assigned to each sub-frame, so that the four streams can be transmitted via the two sub-frames.

According to the code division multiplexing (CDM) scheme, the CQI is CDM-processed over the extended resource areas (e.g., two sub-frames), or is CDM-processed for each basic transmission unit, so that the resultant CQI is transmitted to a desired destination.

The above-mentioned partial transmission method may be extended to at least two sub-frames.

In other words, if the amount of feedback information to be transmitted is M, M−P1 (where $P1 \leq M$) is transmitted to the first sub-frame, M−P1−P2 (where $P2 \leq M$) is transmitted to the second sub-frame, and M−P1−P2 . . . −PK (PK<M, P1+P2+P3+ . . . +PK=M) is fed back to a K-th frame.

In the case of the CDM scheme, data is CDM-processed over all extended areas or is CDM-processed for each basic transmission unit, so that the resultant data is transmitted to a desired destination.

<Index Transmission Scheme>

As described above, the present invention determines whether the mobile station (MS) uses the non-MIMO mode or the MIMO mode, decides to repeatedly transmit target information or decides to divisionally transmit the target information over the extended areas according to the determined mode, so that it must inform the mobile station (MS) of the above-mentioned decision result. Therefore, the number of various cases capable of commanding the above-mentioned decisions may occur, so that the amount of control information of a downlink channel unavoidably increases.

Therefore, the present invention indicates whether the mobile station (MS) is in the MIMO mode or the non-MIMO mode using only one bit, indicates whether the control information is repeatedly transmitted using only one bit, and indicates whether the control information is divisionally transmitted using only one bit, so that it can represent all the number of cases using index information composed of 3 bits.

The present invention includes a table associated with the above-mentioned index information in each of the base station (BS) and the mobile station (MS), so that the amount of downlink-channel control information can be reduced.

An exemplary index table for notifying the ACK/NACK partial transmission and the CQI partial transmission on the condition that the MIMO mode is pre-notified is shown in the following Table 1:

TABLE 1

| Index | MIMO | ACK/NACK repetitive transmission | CQI partial transmission |
|---|---|---|---|
| 0 | X | X | X |
| 1 | X | ○ | ○ |
| 2 | ○ | X | ○ |
| 3 | ○ | ○ | ○ |

Provided that the MIMO mode of the mobile station (MS) can be pre-recognized, the above-mentioned index table indicates whether the ACK/NACK is repeatedly transmitted on the condition that only the ACK/NACK has been designed to be repeatedly transmitted, or indicates whether the CQI is partially transmitted on the condition that only the CQI has been designed to be transmitted over the extended areas.

<Frequency Hopping>

According to the above-mentioned partial transmission method, parts transmitted over the extended area need not always to be located at the same sub-frame or the same locations within different sub-frames. Also, the repeated parts for use in the repetitive transmission method need not to be located at the same location within the sub-frames.

Figure 3:
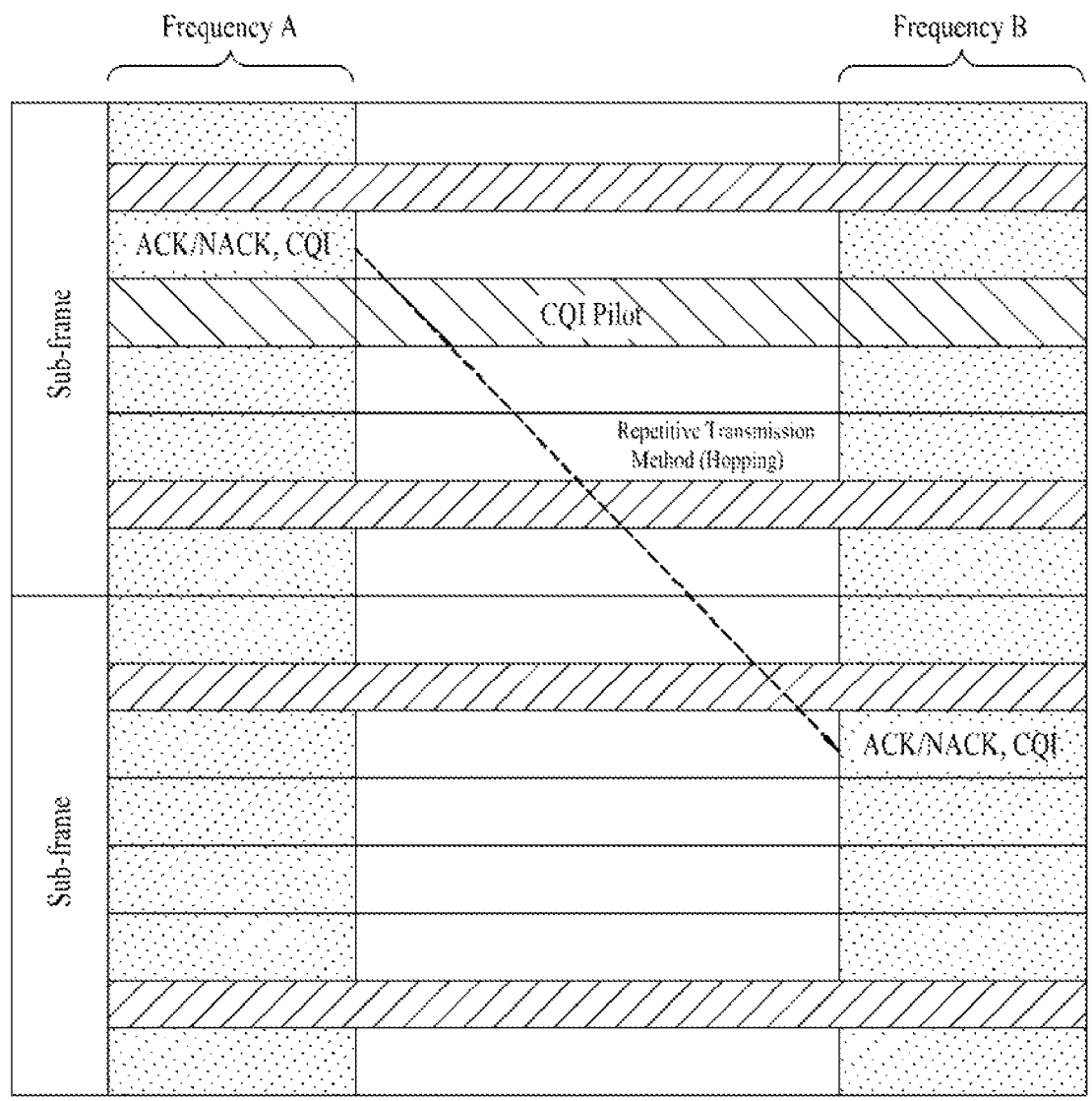
FIG. 3 is a conceptual diagram illustrating a method for multiplexing uplink control information from among the inventive resource allocation methods according to an embodiment of the present invention.
Figure 4:
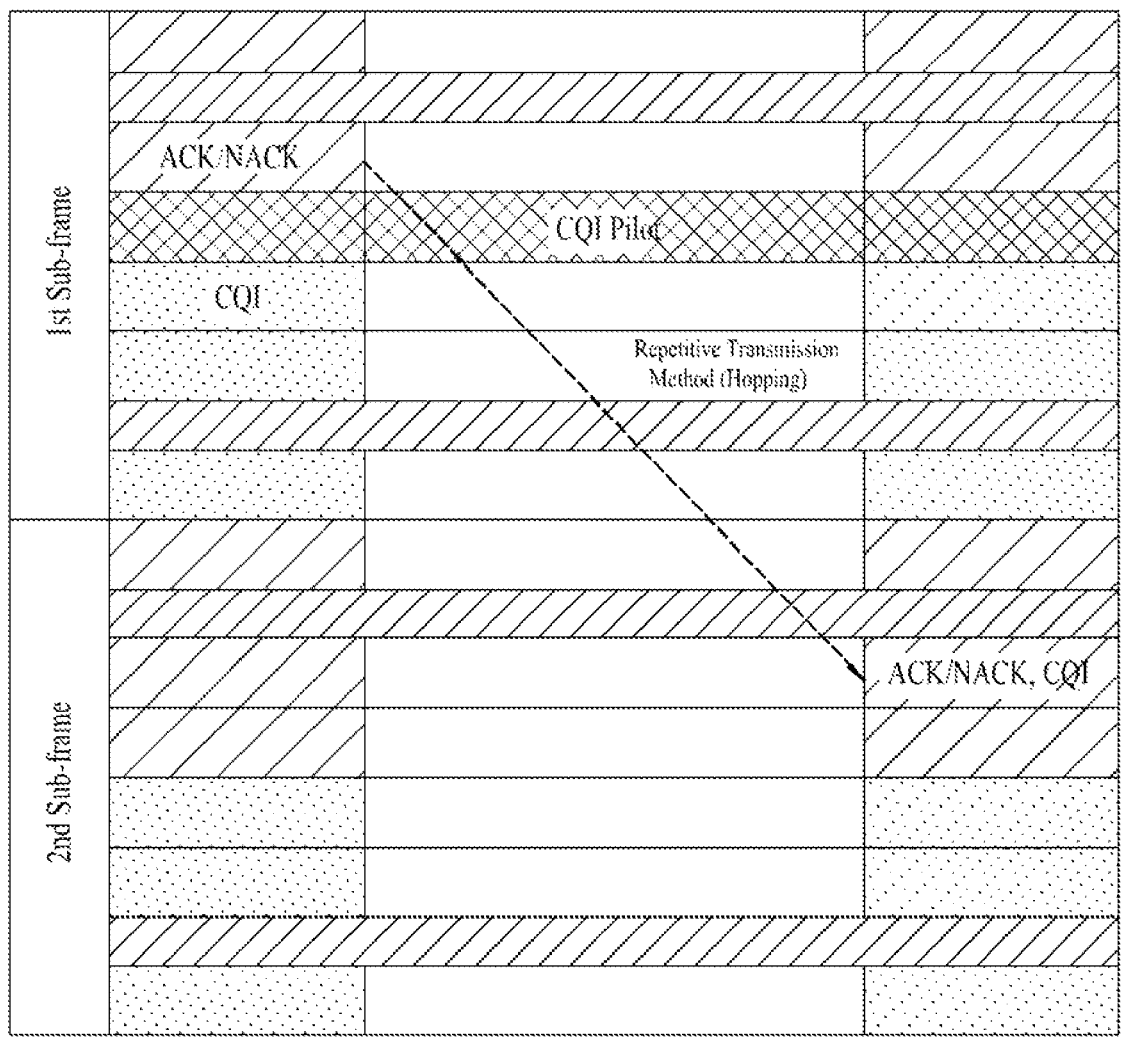
FIG. 4 is a conceptual diagram illustrating a method for multiplexing uplink control information from among the inventive resource allocation methods according to another embodiment of the present invention.

FIG. 3 is a conceptual diagram illustrating the repetitive transmission method from among the inventive resource allocation methods.

As can be seen from FIG. 3, the uplink control information (e.g., ACK/NACK or CQI) is transmitted from the frequency-A area, and hops onto the frequency-B area during the repetitive transmission case, so that it is transmitted over the A and B areas. In this case, the basic hopping period (i.e., symbol, sub-frame, and other prescribed length) may be established in various ways.

<Partial Pre-Reserved Method>

If the base station (BS) separately decides the block information (SB or LB) for allocating uplink resources via downlink control information, a repetitive- or partial transmission-method, and a localized/distributed method, the base station (BS) can effectively use uplink resources due to the smoothly-allocated resources, however, the amount of downlink control information increases. Therefore, there is needed an improved method capable of providing the flexibility of a predetermined level to the above-mentioned method for allocating uplink resources, simultaneously while reducing the amount of downlink control information.

Therefore, different resource distribution methods according to the category of a block for uplink resource allocation and the category of uplink control information are pre-engaged between the base station (BS) and the mobile station (MS). The base station (BS) allocates resources to the above-mentioned block according to the above-mentioned resource distribution method, so that a trade-off between a first requirement for guaranteeing the resource allocation flexibility and a second requirement for minimizing the amount of downlink control information can be made available.

<Maintenance of Single-Carrier Characteristic>

In order to maintain single-carrier characteristic between uplink control information pieces, a CQ pilot is periodically transmitted to the uplink while being allocated to a single symbol or all symbols (or a single block or all blocks), and is then transmitted to a desired destination. Preferably, the ACK/NACK and the CQI may not be simultaneously transmitted to different frequency bands.

As can be seen from FIG. 3, a sub-frame in the transmission case of the CQ pilot is different from that in the non-transmission case of the CQ pilot.

Therefore, provided that the sub-frame including the CQ pilot is called an A type, and the other sub-frame including no CQI pilot is called a B type, the A and B types can be transmitted to a variety of combinations according to transmission periods of the CQ pilot. For example, the CQ pilot can be transmitted in the order of A→B→B→A→B→B. In other words, the CQ pilot may be periodically transmitted or may also be non-periodically transmitted.

Preferably, the single-carrier characteristic between the uplink control information and uplink user data may be maintained. For example, there is no problem in a specific case in which only control information is transmitted without involving uplink data. However, if a user must simultaneously transmit the data and the control information, he or she may perform a single DFT on the transmission data or information to maintain the single-frequency characteristic, and may transmit the DFT-processed result along with the transmission data or information.

The present invention can adaptively allocate uplink resources to a target object according to the number of users contained in the base station's coverage and the variation of an amount of feedback information, so that it can effectively use the resources, resulting in an increased communication throughput between a mobile station (MS) and a base station.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of allocating resources for transmitting uplink control information at a mobile station (MS) in a mobile communication system, the method comprising:
receiving, by the MS, control information established by a base station (BS) in consideration of a system situation; and
allocating resources for transmission of an uplink control channel to the uplink control information to maintain a single-carrier characteristic between constituent information pieces of the uplink control information,
wherein the resources for transmission of the uplink control channel are determined according to the received control information.

2. The method according to claim 1, wherein the resources for transmission of the uplink control channel hop from one frequency to another frequency during a hopping period.

3. The method according to claim 1, wherein the received control information includes at least one of an amount of resources available for transmitting the uplink control information and a location of the resources available for transmitting the uplink control information.

4. The method according to claim 3, wherein the received control information further includes information indicating a resource distribution scheme.

5. The method according to claim 4, wherein the resource distribution scheme controls a resource allocation area to be greater or less than a basic resource allocation unit in order to accommodate the uplink control information if an amount of uplink control information to be transmitted is different than the basic resource allocation unit.

6. The method according to claim 4, wherein the resource distribution scheme performs resource allocation so that the uplink control information is repeatedly transmitted over several symbols or sub-frames.

7. The method according to claim 1, further comprising allocating the resources to overall parts of a single block if the uplink control information is a pilot for channel estimation (CQ pilot).

8. The method according to claim 1, wherein the resources for transmission of the uplink control channel are allocated to the uplink control information to maintain a single-carrier characteristic between the uplink control information and uplink data.

9. The method according to claim 1, wherein the uplink control information is multiplexed along with at least one of uplink user data and other control channels, and the multiplexed uplink control information is transmitted.

10. A method for transmitting downlink control information to allocate resources of an uplink channel at a base station (BS) in a mobile communication system, the method comprising:
generating, by the BS, the downlink control information for allocating resources of the uplink control channel in consideration of a system situation; and
transmitting the downlink control information to a mobile station (MS),
wherein the mobile station allocates resources for transmission of the uplink control channel to uplink control information to maintain a single-carrier characteristic between constituent information pieces of the uplink control information, and
wherein the resources for transmission of the uplink control channel are determined according to the downlink control information.

11. The method according to claim 10, wherein the resources for transmission of the uplink control channel hop from one frequency to another frequency during a hopping period.

12. The method according to claim 10, wherein the downlink control information includes at least one of an amount of resources which can be used for transmitting the uplink control information and a location of the resources which can be used for transmitting the uplink control information.

* * * * *

UNITED STATES PATENT AND TRADEMARK OFFICE
CERTIFICATE OF CORRECTION

| | |
|---|---|
| PATENT NO. | : 7,907,567 B2 |
| APPLICATION NO. | : 11/865639 |
| DATED | : March 15, 2011 |
| INVENTOR(S) | : Hak Seong Kim et al. |

It is certified that error appears in the above-identified patent and that said Letters Patent is hereby corrected as shown below:

Col. 9, line 27, 29, and 38 of claim 1, please replace "control" with "system"

Col. 9, line 29 of claim 1, between "information" and "established by" please insert --for transmission of the uplink control information--

Col. 9, line 30 of claim 1, please delete "in consideration of a system situation"

Col. 9, line 43 of claim 3, please replace "control" with "system"

Col. 9, line 43 of claim 3, please delete "one of"

Col. 9, line 45 of claim 3, please replace "and" with "or"

Col. 9, line 48 of claim 4, please replace "control" with "system"

Col. 10, line 5 of claim 5, please insert --the-- before "uplink"

Col. 10, line 5 of claim 5, please replace "than" with "from"

Col. 10, line 19 of claim 9, please replace "wherein" with "further comprising multiplexing"

Col. 10, line 20 of claim 9, please delete "is multiplexed along" and "one of"

Col. 10, line 21 of claim 9, please replace "and" with "or"

Col. 10, line 21 of claim 9, please replace "," with ";"

Col. 10, line 22 of claim 9, please delete "is transmitted"

Signed and Sealed this
Twenty-second Day of November, 2011

David J. Kappos
*Director of the United States Patent and Trademark Office*

CERTIFICATE OF CORRECTION (continued)
U.S. Pat. No. 7,907,567 B2

Col. 10, line 23 of claim 10, between "of an uplink" and "channel" please insert --control--

Col. 10, line 23, 27, 30 of claim 10, please replace "control" with "system"

Col. 10, line 24 and 28 of claim 10, between "resources" and "of" please insert --for transmission--

Col. 10, line 29 of claim 10, please delete "in consideration of a system situation"

Col. 10, line 32 of claim 10, please delete "mobile station allocates" and "for trans-"

Col. 10, line 33 of claim 10, please delete "mission of the uplink control channel"

Col. 10, line 33 of claim 10, please insert --are allocated-- before "to uplink"

Col. 10, line 37 of claim 10, please delete "for transmission of the uplink con-"

Col. 10, line 37 of claim 10, please delete "-trol channel"

Col. 10, line 45 of claim 12, please replace "control" with "system"

Col. 10, line 45 of claim 12, please delete "one of"